Aug. 17, 1937. C. H. WILSON ET AL Re. 20,476

TEMPERATURE CONTROLLER RECORDER INCLUDING METHOD AND APPARATUS

Original Filed Dec. 14, 1923 7 Sheets-Sheet 1

INVENTORS
Charles H. Wilson,
Cuthbert T. Brown,
By Harold D. Penney
ATTORNEY

TEMPERATURE CONTROLLER RECORDER INCLUDING METHOD AND APPARATUS

Original Filed Dec. 14, 1928 7 Sheets-Sheet 2

INVENTORS
Charles H. Wilson,
Cuthbert J. Brown,
By Harold D. Penney ATTORNEY

TEMPERATURE CONTROLLER RECORDER INCLUDING METHOD AND APPARATUS
Original Filed Dec. 14, 1928 7 Sheets-Sheet 3
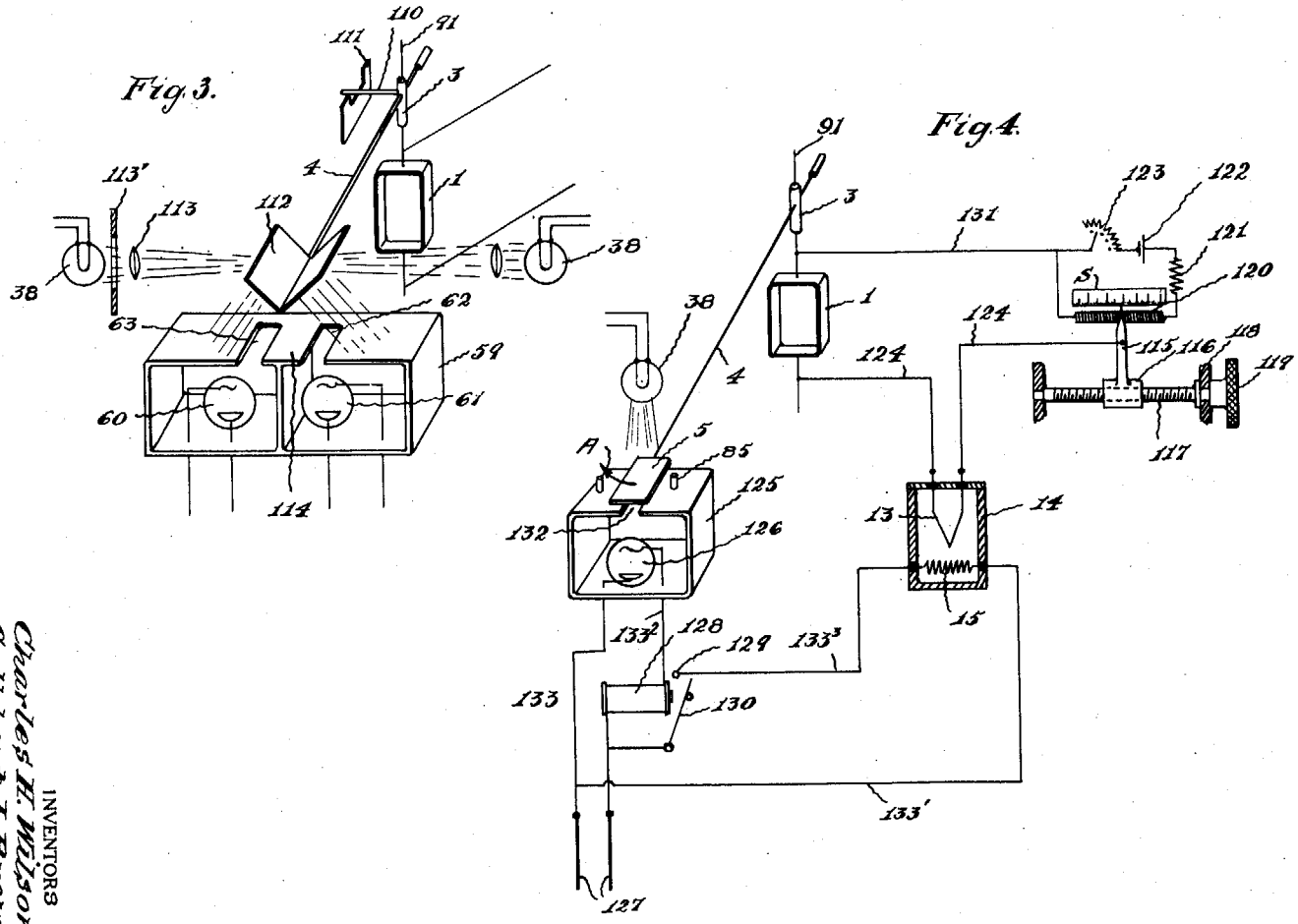
INVENTORS
Charles H. Wilson,
Cuthbert J. Brown,
By Harold D. Penney, ATTORNEY TEMPERATURE CONTROLLER RECORDER INCLUDING METHOD AND APPARATUS
Original Filed Dec. 14, 1928 7 Sheets-Sheet 4
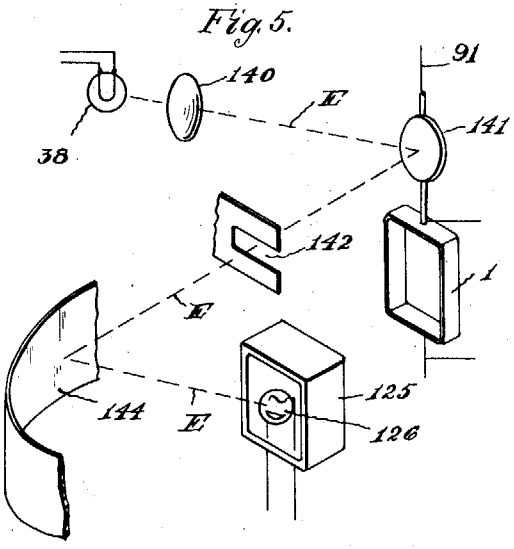
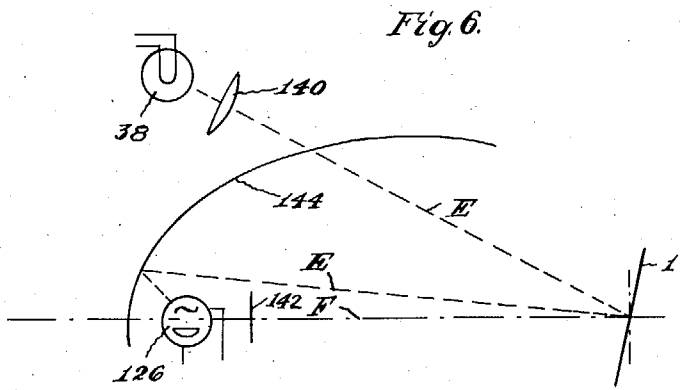
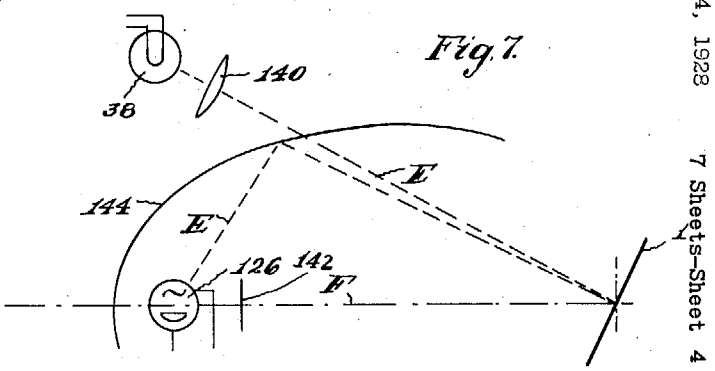
INVENTORS
Charles H. Wilson,
Cuthbert J. Brown,
By Hardy D. Ferney ATTORNEY TEMPERATURE CONTROLLER RECORDER INCLUDING METHOD AND APPARATUS
Original Filed Dec. 14, 1928 7 Sheets-Sheet 5
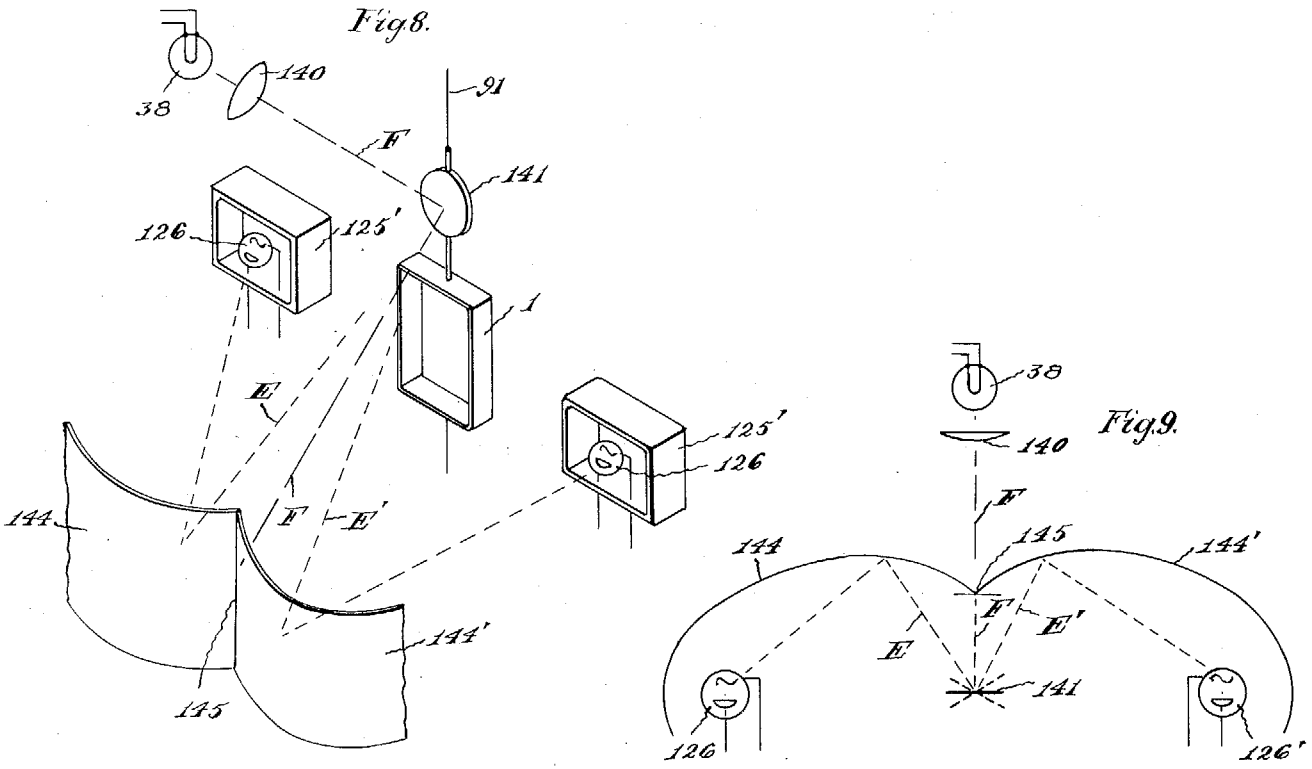
INVENTORS
Charles H. Wilson,
Cuthbert J. Brown,
By, Harold D. Penney ATTORNEY Aug. 17, 1937. C. H. WILSON ET AL Re. 20,476

TEMPERATURE CONTROLLER RECORDER INCLUDING METHOD AND APPARATUS

Original Filed Dec. 14, 1928 7 Sheets-Sheet 6

INVENTORS
Charles H. Wilson,
Cuthbert J. Brown,
By, Charles D. Penney ATTORNEY

TEMPERATURE CONTROLLER RECORDER INCLUDING METHOD AND APPARATUS
Original Filed Dec. 14, 1928 7 Sheets-Sheet 7
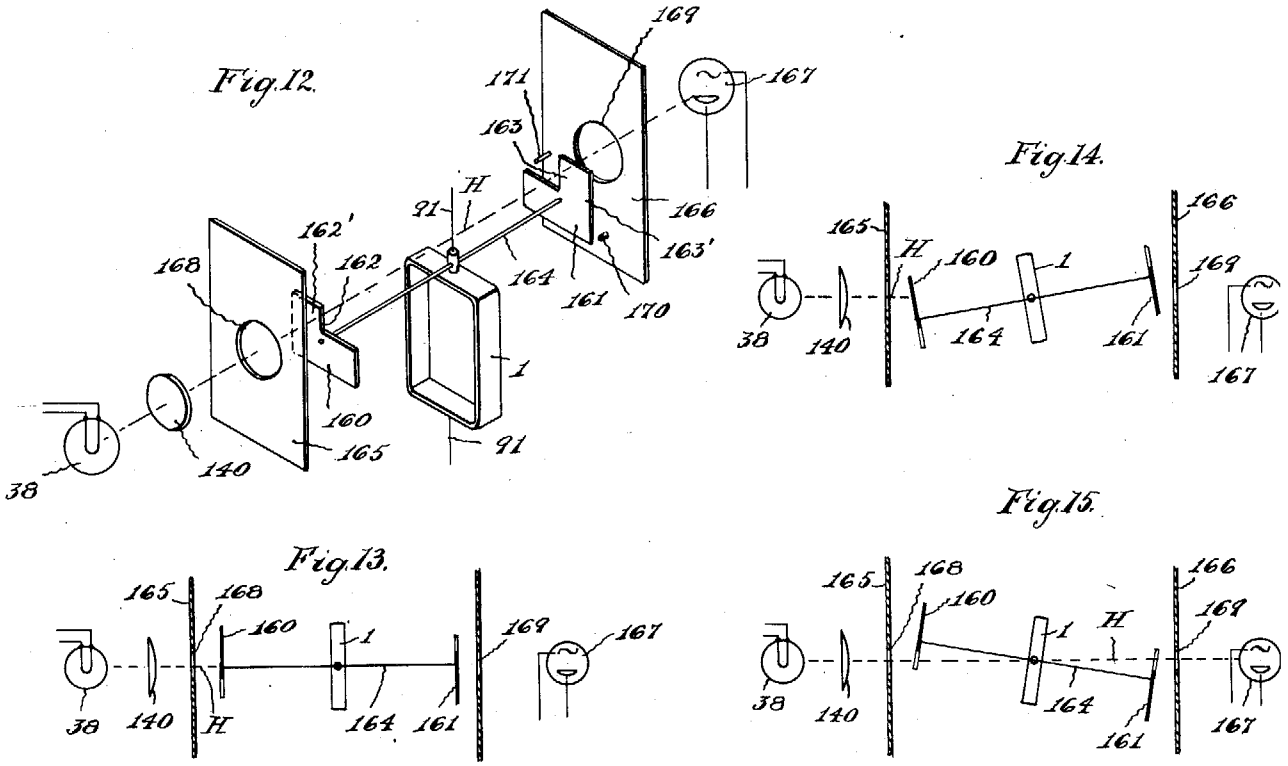
INVENTORS
Charles H. Wilson,
Cuthbert J. Brown,
By, Harold D. Penney ATTORNEY Reissued Aug. 17, 1937 Re. 20,476

UNITED STATES PATENT OFFICE 20,476

TEMPERATURE CONTROLLER RECORDER INCLUDING METHOD AND APPARATUS

Charles H. Wilson, Pelham, N. Y., and Cuthbert J. Brown, Foxboro, Mass., assignors, by mesne assignments, to The Foxboro Company, Foxboro, Mass., a corporation of Massachusetts Original No. 1,930,496, dated October 17, 1933, Serial No. 326,074, December 14, 1928. Application for reissue October 12, 1935, Serial No. 44,752

27 Claims. (Cl. 236—69)

Our present invention relates to an improvement in method and apparatus for utilizing light-actuated means for causing controlled actuation of recorders, recording chronographs, autograph recorders, repeaters, pyrometer controls of the automatic furnace-temperature control type, and similar instruments of the above noted class, wherein various kinds of records and analyses are made, to which such appliances may be directed.

In the present disclosure, we have, for the purpose of outlining a characteristic, specific application of our improvement, disclosed its ready adaptation to the control of temperature recording apparatus as utilized in conjunction with an automatic temperature controlling system of novel design, primarily adapted to control the temperatures of industrial furnaces. In this particular system, the predetermined temperature desired is set by manually controlled means which are related to control contacts in such system, and by means of a furnace thermocouple in control of a galvanometer, operating under the so-called null method, the deflections of the thermocouple influenced galvanometer, which delicate element is freed of all mechanical incumbrance, affect the system to maintain furnace temperatures within desired limits, as will be hereinafter described more in detail.

The galvanometer herein referred to, as controlled by the thermocouple or heat sensitive current source, may be of the deflector, null method or semi-potentiometer types.

One of the main objects of the present improvement in recording and controlling temperatures is the joint utilization of a fixed source of light and light-actuated, current-passing means in a control circuit, such light-actuated means being in either the form of the well known selenium cell or its improved equivalent, the photoelectric cell, whereby a galvanometer, operating under the influence of currents generated by a furnace heated thermocouple of any suitable type, and carrying an intermittent acting light intercepting means, operative between said light source and light-actuated current-passing means, causes initiating control operation, and cycle, of a series of associate circuits and mechanism whereby to regulate furnace temperatures, whether the source of furnace heat be oil or gas fuel, electric or steam, and regardless of the kind of mechanical means involved to control the heat sources.

A further object of the improvement is the provision of such means upon the galvanometer whereby to control said light source and thereby a sequential acting control or recording means, whereby said galvanometer is relieved of all unnecessary load in its performance of intermittent control of the operation of associate devices and which, in its present adaptation, is utilized only to cut off or expose a beam of light to the light sensitive means, according to predetermined cycle and setting. Thus, the galvanometer is subjected to no restraint whatever, except as to predetermined limitation of its amplitude of oscillation by stops provided for this purpose.

Another object of the herein disclosed device is to provide a light-actuated, sensitive, quick-acting control system whereby relays may be operated to cause desired sequential operation of mechanical or electrical means of any kind other than those specifically herein referred to.

The advantages accomplished by the herein control method and apparatus are extreme sensitivity of action, speed of cycle operation, and where applied, in any of its modifications as a temperature control means for furnaces, as more specifically hereinafter outlined, the heat-treaded products from the furnace are improved in quality, are uniform and can be produced in greater quantity with a minimum of labor and fuel costs.

As will hereinafter be noted, a number of modified structures and means may be developed, but the underlying principle in all such modifications is the same, and are herein held to be equivalent, and these and such obvious modifications as are not herein disclosed are considered to be within the scope of the broader claims herein.

The principle and certain applications of this invention are diagrammatically illustrated in the accompanying drawings in which:

Fig. 3 is a diagrammatic view of a modified form of galvanometer, photoelectric control mechanism, illustrating the use of optical condensers and reflectors in conjunction with the photoelectric cells.

Fig. 4 is a diagrammatic view of a modified galvanometer, photoelectric control system with a manually operated mechanism adapted to establish a temperature control point.

Fig. 5 is a diagrammatic view of a modified galvanometer control mechanism for the system shown in Fig. 4 showing a galvanometer actuated reflector used with a secondary curvilinear reflector of fixed type.

Figs. 6 and 7 are diagrammatic plan views illustrating the range of the light rays in the modification shown in Fig. 5 during operative periods.

Figure 1:
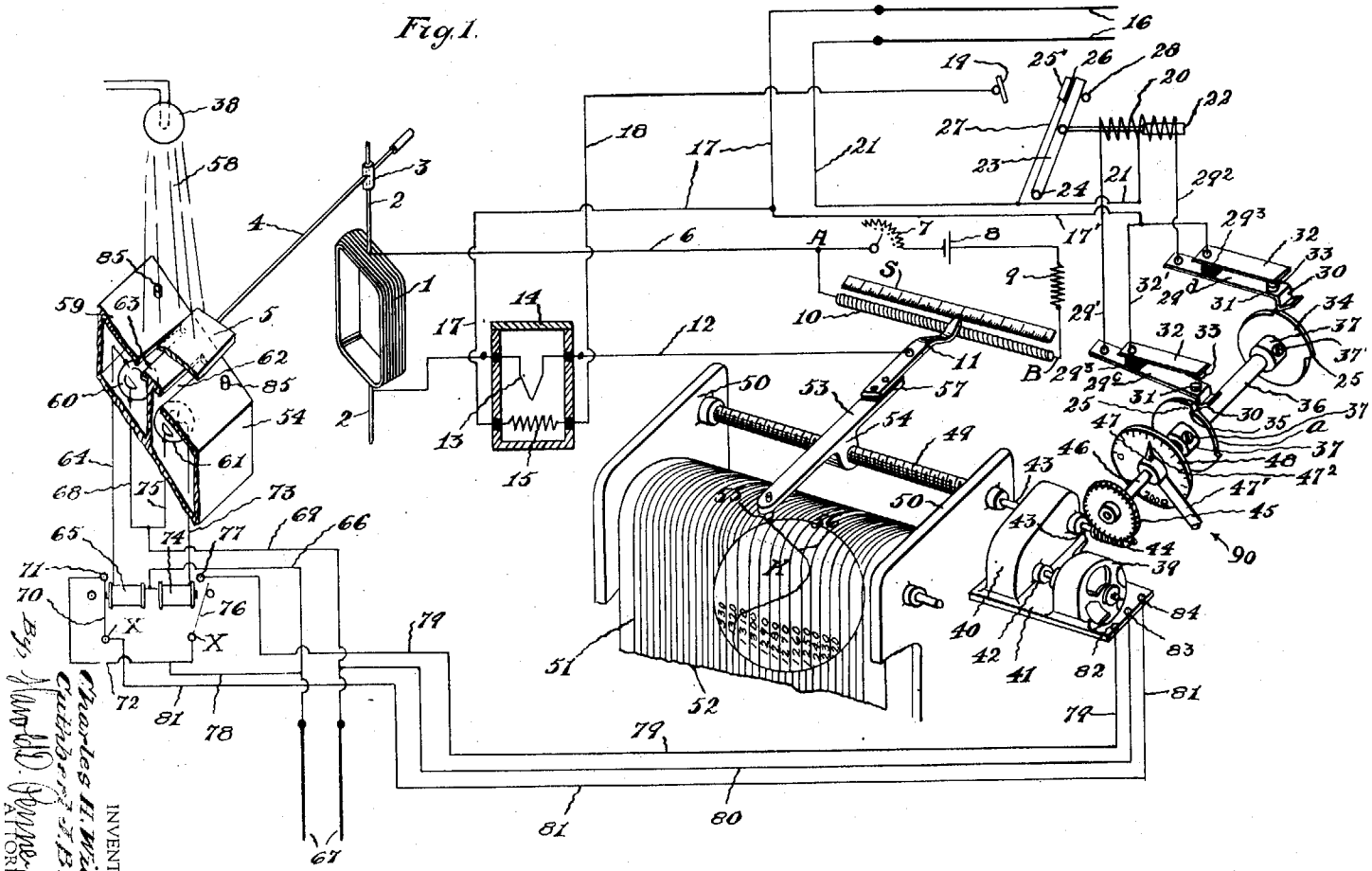
Fig. 1 is a diagrammatic view of an automatic recording and temperature control system embodying our invention.
Figure 2:
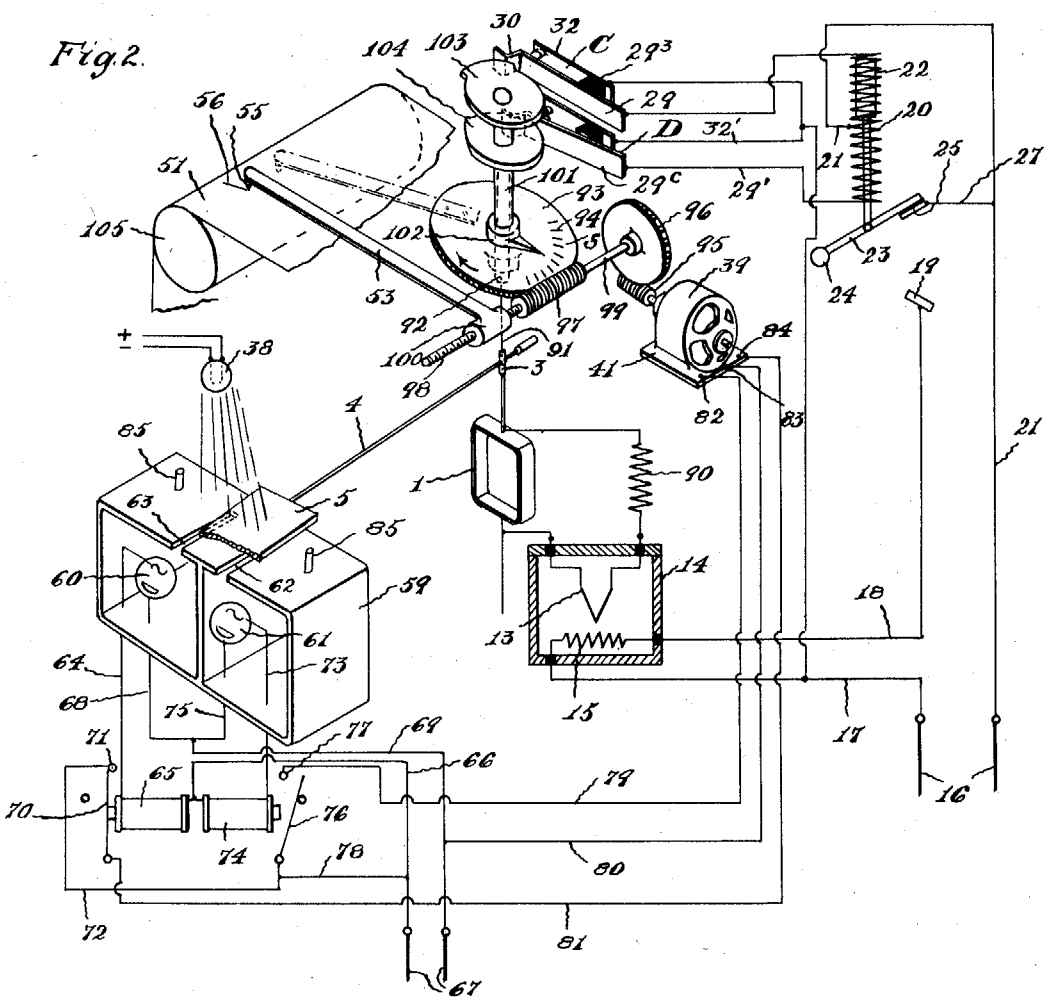
Fig. 2 is a diagrammatic view of a modified form of automatic recording and temperature control system embodying our invention, illustrating the control of the galvanometer-photoelectric mechanism directly from the reversible motor mechanism.

Fig. 8 is a diagrammatic view of a galvanometer having optical means associated therewith to actuate a dual photoelectric cell control adapted, as an alternative embodiment, to be used in the systems shown in Figs. 1 and 2, showing a light reflecting means rigidly mounted on a suspended or pivoted movable galvanometer and used with a fixed double curvilinear reflector, with a single source of light and light concentration, in which the galvanometer, and its reflector are the only moving parts.

Fig. 9 is a plan view of the means shown in Fig. 8, disclosing diagrammatically the action of the light rays and range of action thereof.

Figure 10:
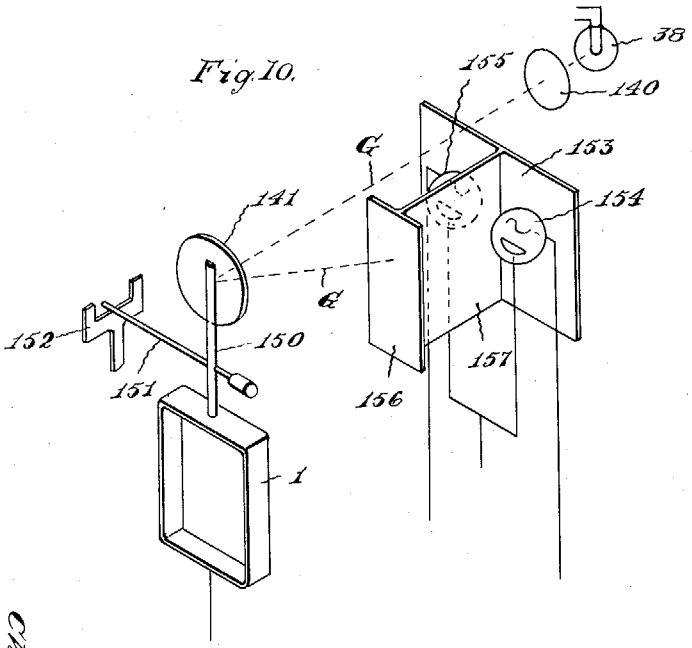

Fig. 10 discloses a diagrammatic view of a further modification of a photoelectric controlling mechanism of a similar type to that shown in Fig. 8 with fixed photoelectric cell light intercepting shields.

Figure 11:
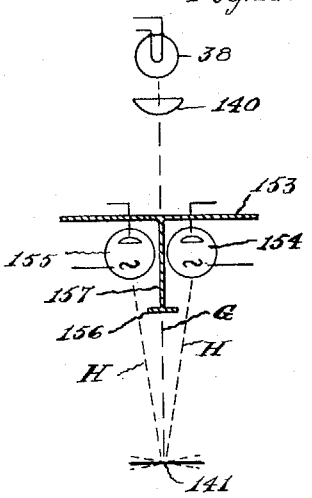

Fig. 11 is a plan view of the means disclosed in Fig. 10 showing the range of action.

Fig. 12 shows a diagrammatic view of a galvanometer-actuated balanced shutter means of the type shown in Fig. 5 and adapted to be used in connection with a system such as is shown in Fig. 4.

Figs. 13, 14, and 15 are plan views of the mechanism in Fig. 12 showing, diagrammatically, certain steps in the operative scope and range of the latter modification.

Referring now to the accompanying drawings, Fig. 1 discloses a furnace temperature control system, in diagrammatic outline, in which a pivoted or suspended galvanometer moving coil 1 is suitably mounted upon a shaft 2. The shaft 2 is supported for pivotal movement at its upper and lower ends by bearings or suspensions, not shown. The upper end of the galvanometer shaft 2 mounts a collar 3, through which is firmly mounted a shutter stem 4, upon one end of which is carried a light intercepting photoelectric cell controlling shutter 5. The shutter is operatively associated with a housing 54 and its enclosed photoelectric cells 60, 61 to control the action of the cells, the manner of which will be later described.

Slide wire 10, rheostat 7, fixed resistance 9 and source of current supply 8 comprise the potentiometer circuit, the current through which is adjusted by rheostat 7 and standardized by comparison against a known E. M. F. such as a cadmium cell, not shown, in the known and usual manner. The galvanometer coil 1 and thermocouple 13 are connected in series across the potentiometer circuit by conductors 6 and 12.

At point "A" the connection is fixed, the other connection being made through sliding contact 11 along slide wire 10. When the current through the potentiometer circuit is correctly adjusted, the voltage drop between points "A" and "B" equals the voltage range of the thermocouple when subjected to the lowest and highest heats, so that whatever temperature, and therefore voltage, to which the thermocouple may be subjected, the sliding contact 11 can be moved to a point of equal and opposite voltage along the slide wire 10, at which point, of course, the voltages being equal and opposite, no current will flow through the galvanometer coil in which case it takes up its zero position with the shutter covering both apertures.

When the temperature of the furnace increases or decreases, the voltage of the thermocouple proportionately increases or decreases, causing a current to flow in either one direction or the other through the galvanometer coil, which deflects in a direction respectively to the flow of current and uncovers either the one or the other aperture.

Heat leg of the current main 16 is connected to the middle tap of a controller relay coil 20, by a conductor 21.

Within the controller relay coil 20 is mounted a reciprocable plunger 22, one end of which is pivotally attached to a pivoted switch arm 23, the pivot point 24 thereof being firmly supported by means, not shown. The arm 23 carries thereon, on its outer end, a contact terminal 25' for contact with terminal 19, said terminal being insulated from the arm 23 by insulation 26. Terminal 25' is electrically connected to line 21 by a conductor 27. In its open position switch arm 23 is stopped by stop pin 28, suitably mounted.

The control relay coil 20 is connected at one of its ends to the spring terminal $29^c$ of a cam-controlled closeable contact switch by conductor 29'. The opposite end of the controller relay coil 20 is connected to a second similar cam-controlled switch spring terminal $29^d$ by a conductor $29^2$. Thus, the lower cam-actuated terminals $29^c$ and $29^d$ are located in series with the relay 20.

Both terminals $29^c$ and $29^d$ are associated with cooperating upper terminals 32, these latter being insulated from terminals $29^c$ and $29^d$ by insulation $29^3$, and being connected by conductor 32' to the heater coil 15 by conductor 17—17'. Both cam-controlled switches are provided with contact points 31—33, in the usual manner. As the switches are shown in Fig. 1, the lower one is open and the upper one is closed.

In order to effect the control of the above noted switches, there is located below said switches an operative assembly comprising, generally, a reversible electric motor 39 which indirectly drives two settable cams 34—35, each of which is variably fixed on stepped shafts 36—46, but are adjustable, as to the radial positioning of their raised cam contours 25 with scale 48, which contact with the spring terminals $29^c$ and $29^d$ of the relay switches. This action will be described in detail later.

In the positions shown, the lower relay switch is open and the upper relay switch is closed. In this position the furnace heater coil 15 will be cut out of operative circuit by reason of the excitation of the rear end of the controller relay coil, said coil being in circuit with the main 16, thus drawing the switch plunger 22 to the rear and holding switch 23 in open position. Movement of the cam shaft 36 causes the cams 34—35 to alter their contact positions, causing the upper cam to release its switch and the lower cam to close its switch, thereby exciting the other side of the relay 20, drawing plunger 22 to the forward position, and closing contacts 19—25', thereby putting the furnace heater coil into closed circuit with main 16.

The cams 34—35 are provided with integral hubs 37 in which are mounted set screws 37', whereby the cams are adjustably located upon shaft 36, so that their raised cam contours 25 may be radially related or varied, to increase or decrease the related angular position of said cam contours to set the limits of temperature variation to desired degrees. The lower cam is mounted adjacent to an indicator dial 48 which is provided with indices 47² at its outer edge reading in desired temperature indications. The shaft 46 has keyed, at its outer end, a worm wheel 45 and is rotatably supported in a bearing 47, this in turn being fixedly mounted upon a bracket 47′ which forms a part of the appurtenant framing, not shown.

The scale dial 48 is fixed to the shaft 46 which carries worm wheel 45, operated by worm 44. The gear ratio of worm wheel 45, worm 44 and screw thread 49 are so made that whatever temperature is indicated by contact index 11 on the scale S corresponds to the temperature indicated on scale 48 by index 47².

It will thus be seen that radial movement of the cams 34—35 in either direction from their set points 48 causes controlled closing and opening of the upper and lower switches 32—32, alternately, either to start or stop the temperature-creating means 15.

As a means for driving the above noted apparatus and other related devices herein, later to be described, there is provided the previously noted reversible electric motor 39 which is mounted upon a base plate 41 which may be part of the associate framing, not shown. The base also mounts a reduction gear set enclosed in the base-mounted housing 40, said housing supporting a motor driven gear coupling 42, which drives the enclosed gearing. The opposite end of the housing supports a gear driven shaft 43, on one end of which is mounted a worm 44, which in turn drives the cam shaft operating worm wheel 45, previously described.

The opposite end of the gear shaft 43 is connected to a rotatable slide operating lead screw 49 which is mounted in opposite side frames 50, these forming a part of the machine framing. These side frames may also form a supporting means for operatively mounting a temperature record receiving roll or drum 51 which may be synchronously driven with the associate mechanism by a timed, separate motor gear drive or clock, not shown.

The record roll or drum is ruled with lines 52 thereon representing the same temperature values as the index graduations on cam dial 48, and on slide scale S, the graduations being shown enlarged at the circle K.

Operatively mounted upon the lead screw 49 is a travelling stylus arm 53 which mounts a threaded bearing nut 54 whereby to cooperate engageably with the lead screw 49. Thus, when the lead screw 49 is rotated in either direction by the motor 39, the stylus arm 53 will move to and fro along the length of the lead screw.

One end of the stylus arm 53 carries therein a recording stylus or roll marker 55 whereby to inscribe upon the record roll or drum 51, a graph 56, in accordance with the combined movements of the stylus arm when actuated by the lead screw 49, and the rotation of the record roll 51.

On the opposite end of the stylus arm 53 and electrically separated therefrom by means of insulation 57 is mounted a slide wire contact 11, which may be suitably affixed in position on the arm 53 by means of rivets or other suitable securing means.

Rotation of the lead screw 49 causes the stylus arm 53 to traverse the lead screw and to move the slide 11 across the slide wire 10, and also to carry the stylus 55 across the moving drum or record 51.

The photoelectric mechanism which controls the operation of the reversible motor 39 will now be described in detail.

There is provided, as shown at the left hand side of Fig. 1, a suitable source of light such as 38, of fixed intensity, the rays of which are indicated by lines 58 which impinge upon the galvanometer-carried shutter 5.

The shutter 5 is located over a housing 59, the front of which is broken away in order to disclose the mounting therein of two photoelectric cells 60 and 61. The two cells are mounted in separate compartments and enclosed in a light-proof manner. The compartments are provided on the tops thereof with light ports 62, 63. Normally, these ports are shielded from the light rays 58 by shutter 5 so that these cells are inactive during such period.

Stops 35 are provided on the housing 59 in the path of movement of the shutter 5 so as to limit the movement of the shutter in either direction.

One terminal of the photoelectric cell 60 is connected to a relay 65 through a conductor 64, a line 66 completing the connection to one leg of a main source of current supply 67, which supplies current from the motor 39. The other cell terminal 68 is connected through conductor 69 to the opposite leg of current supply 67. A conductor 80 leads from the conductor 69 to the intermediate terminal 83 of the reversible motor 39.

The second photoelectric cell 61 is also connected to the main current source 67 in which one terminal thereof is connected directly to said main by conductors 75, 69. The other terminal of said cell is connected to a second relay 74 through a conductor 73 and conductor 66, common to both relays 65 and 74, completes the connection of these to one leg of the main 67.

Thus, it will be seen that both cells 60 and 61 are connected to, and control the flow of current from a common source 67 to control the motor 39, the details of which will now be described.

Each of the relays 65 and 74 has associated therewith motor circuit-controlling switches 70 and 76 respectively. These switches are pivotally mounted at contacts X and are limited in their outward movement by means of stops, as shown. Normally the switches are in their outer or open circuit positions relative to the armatures of the relays.

The switch 70, shown closed, is connected by conductor 81 to an outer terminal 84 on the motor 39. The other switch 76 is connected through a conductor 78 to the main 67, this latter conductor being common to both contacts X.

When the switch 70 is drawn towards its associated relay 65 by actuation of the cell 60, the switch contacts with terminal 71. The terminal 71 is connected by conductors 72, 78 to one leg of the main 67. The opposite circuit to the motor is through conductor 81 to motor terminal 84, thence to return by intermediate motor terminal 83, conductor 80 to opposite leg of main 67, thus completing the circuit controlled by cell 60.

The operation of the opposite circuit controlled by cell 61 to motor 39 is through switch contact 77 to switch 76 to common conductor 78 to one leg of the main 67. From contact 77 through conductor 79 to motor terminal 82 thence through intermediate motor terminal 83, conductor 80 to opposite leg of main 67.

Thus, operation of either cell 60—61 controls through their associate relays either circuit of the reversible motor and thereby cause such alteration of action in our system, as will be hereinafter set out in detail.

At the beginning of such an operation the furnace would naturally be cold and the voltage generated by the thermocouple would, therefore, be zero, with zero or very low potential from the thermocouple in series with the galvanometer coil connected across potentiometer circuit from "A" to 11, a current would flow from the potentiometer circuit through the galvanometer circuit deflecting the galvanometer in such a direction as to uncover one of the photoelectric cells which would energize the motor in a direction that would turn the worm 44 and lead screw 49 and it would keep turning until the slide 11 had reached a point on slide wire 10 where the voltage of the thermocouple equaled the voltage drop from A to 11.

The voltage from the thermocouple then equaling the voltage from A to 11 and being in the opposite direction, no current would flow through the galvanometer and the pointer would return to its zero position covering both ports.

The motor, in turning the lead screw, would operate the pen and stylus 54 and 55 to draw a record of this travel and at the same time it would turn worm wheel 45 and the contact operating cams attached thereto and so close contact switches 29c and 32 to shut the furnace switch 23. Should the temperature of the furnace rise above the predetermined setting the voltage generated by the thermocouple would be greater than the drop in voltage between A and 11. Current would then flow through the galvanometer in the opposite direction causing the galvanometer to deflect and uncover the other photoelectric cell which would operate the motor in the opposite direction so that contact switch 29c would be opened and contact switch 29d closed, so energizing the plunger circuit 22 to open the contact switch 23.

The cams 35 and 34 being adjusted in their radial position to the dial 48 which is in definite relation to the position of the sliding contact index 11 on slide wire scale S so that when the temperature, or the voltage, rather, of the thermocouple varies from that drop across the slide wire from A to 11 the galvanometer swings to uncover either one of the cells energizing the motor in such a direction as to bring the contact 11 back to the point of equal voltage and at the same time it operates cams 34 and 35 to switch on or switch off the heater coil 15 in the furnace.

Thus increase or decrease of temperature within the furnace causes the galvanometer to respond and to move the shutter 5, which in turn causes responsive automatic control of the apparatus to hold the temperature within desired limits.

In this way, not only is a control record obtained of the performance of the furnace, but an automatic temperature control obtained which operates in synchronism with the graphic recording means.

*The modification shown in Fig. 2*

In this system illustrated in Fig. 2 is shown a modification of the system disclosed in Fig. 1. Since many of the cooperating devices and circuits shown in Fig. 2 are similar to those shown in Fig. 1, in structure and function, in some instances like indices, as in Fig. 1, will be used for like structures.

The galvanometer coil 1 is arranged in series with the thermocouple 13 and a calibrating resistance 90. The galvanometer coil is suspended by a torsionable flat suspension spring 91 from rotatable disk shaft 92 which carries a driven worm wheel dial 93 having temperature indicia 94 inscribed on the face thereof. The reversible motor 39 by means of a worm and worm gearing 95, 96, drives a shaft 99 upon which is fixed a dial driving worm 97 which drives the dial 93. A lead screw extension 98, mounted on the end of the shaft 99, mounts a threaded stylus arm 53 thereon for reciprocation by means of its threaded hub or an equivalent 100.

An alternative stylus arm structure shown dotted in this view may be attached directly to the dial 93, permitting the members 98 and 100 to be dispensed with. The stylus 55 and recording means 51 may be arranged as described for Fig. 1. In this structure when the motor 39 rotates in either direction, through the reduction gearing 93, 95, 96, 97, it directly and mechanically influences the movement of the galvanometer to return to a position of balance through torsion of the galvanometer suspension spring 91. A change in thermocouple current causes the galvanometer to deflect from its point of balance thereby exposing either of the cells 60, 61 to the rays from the light source 38.

Thus, rotation of the motor 39 rotates the dial shaft 91 creating a torsional tension on the flat spring suspension 91. The direction of dial shaft rotation is opposite to the deflection movement of the galvanometer; therefore the galvanometer is influenced by thermocouple current to initiate temperature control and recording changes and is mechanically restored to balanced position.

As a means for causing the above noted control and recording sequences, a vertical shaft 92 is arranged to rotate in a hollow support bearing 101 which carries an index point 102 rigidly affixed thereto, these being part of the frame mounting, not shown. The shaft 92 further has a pair of cams 103, 104 rigidly, but adjustably, attached at its upper end. Thus, the shaft 92, cams 103, 104 may be rotated as a unit relative to the index point 102. The cams are independently radially adjustable on the shaft similar to that shown and described for Fig. 1. A furnace heater switch control means C—D, controlled by cams 103 and 104, respectively, controls the current supply to the furnace heater coil 15. Since this cam and switch mechanism is similar to that shown and described in Fig. 1, the details will not be repeated.

Both switches C, D, are connected to a relay coil 22, switch 23 and supply mains 16, as in Fig. 1. The operation of this modified system is similar in most respects to that shown in Fig. 1. The index pointer 102 in this case is fixed and the worm dial 93 movable.

The thermocouple being approximate to the furnace heat, then generates a current which would flow through the galvanometer circuit. The calibration resistance 90, Fig. 1, having been adjusted so that the current through the galvanometer circuit would have a deflecting force on the galvanometer coil which would equal the torsion of the other end of the suspension spring set up by the scale index to correspond with the temperature in the furnace. As for example, if the index 102 pointed to the scale division of 1000 degrees of temperature and if the temperature of the thermocouple in the furnace was also 1000 degrees, the current which would flow through the galvanometer coil would hold the shutter at a point of balance, shutting off the light from both ports, and if the temperature of the furnace and, therefore, the thermocouple current varied from this degree of temperature, it would uncover either one or the other of the photoelectric cell ports and so energize the motor in one direction or the other to restore the point of balance on the galvanometer coil and at the same time would open or close switch C or D to switch on or switch off the heater current in the furnace.

*The modification shown in Fig. 3*

Fig. 3 shows a modification in the galvanometer control structure shown in Figs. 1 and 2. Like numerals are used to indicate elements in Fig. 3 which are similar to like elements shown in Figs. 1 and 2. A galvanometer coil 1 is suspended by a wire support 91, which passes through a cylindrical collar 3. The collar 3 has rigidly affixed thereto a stop pin 110 engageable with a rigidly supported stop plate 111, and also a shutter bar 4 which mounts a V-shaped reflector 112 at its outer end, as a substitute for the shutter 5 of the previous figures.

The coil is connected to the thermocouple mechanism as shown in Figs. 1 and 2. The V-shaped mirror 112 is arranged at the end of arm 4, in a position to be over the light ports 63, 62 of the photoelectric cell box 59, which houses the photoelectric cells 60, 61. Two light sources 38, one mounted on either side of mirror 112, project light through condensing lenses 113, so as to concentrate the light on the opposite faces of the mirror 112.

The mirror is so arranged that when the galvanometer coil 1 is at rest or zero position, the light rays will not be deflected into the ports 63 or 62. Any deflection of coil 1, results in the mirror being moved to the right or left, thus deflecting light into one or the other of the ports 63 or 62.

A diaphragm stop 113' may be interposed between the light sources 38 and the lens 113 for the purpose of definitely focusing and confining the light rays upon the mirror faces.

The stop pin 110 cooperates with the raised lugs of the stop plate 111 to restrict the oscillation of the shutter bar within desired limits.

Thus, this modification shows a dual light means with suitable light modulation and reflecting means for the control of the photoelectric cells.

*The modification shown in Fig. 4*

Fig. 4 illustrates a temperature control system applying the basic principles disclosed heretofore, wherein the galvanometer 1 and thermocouple 13 are arranged in a potentiometer circuit, except that no provision is made herein for recording the temperature changes. As before, a furnace 14 has positioned therein a thermocouple 13 and heater resistance 15. The thermocouple 13 is connected to the galvanometer coil 1 which is supported by a suspension wire 91 from a solid support, not shown. The wire passes through a cylindrical collar 3, to which is rigidly affixed the shutter arm 4 carrying a shutter 5 at the extreme end thereof.

The thermocouple is connected by a conductor 124 to a slide 115 which slides over a potentiometer resistance 120. The threaded slide hub 116 is moved along a lead screw 117 rotatably mounted in bearings 118 by the manual rotation of a knurled head of the lead screw. A scale and index pointer, not shown, may be arranged parallel to the length of the lead screw to provide for predetermined temperature reading index.

The potentiometer slide wire 120 is placed in series in a potentiometer circuit with a rheostat 123, a source of E. M. F. 122 and fixed resistance 121. The thermocouple 13 in series with galvanometer 1 is connected to the potentiometer circuit by connection 131 at a fixed point F, and by connector 124 through sliding contact 115 on the slide wire 120.

The cell 126 is connected on one side directly to one leg of the main current supply 127 by conductor 133 and is connected on the other side through relay coil 128 to the other leg on the mains 127. When relay coil 128 is energized, switch contacts 130 and 129 are closed, allowing current to flow from mains 127 through conductors 133' and $133^3$ through furnace resistor 15.

A housing 125 enclosing a single photo-electric cell 126 therein is disposed beneath the shutter 5 and is provided with a light port 132 immediately beneath said shutter. Stops 85 mounted on the housing limit the oscillation of the shutter.

The shutter is so arranged relative to the port 132 that when the galvanometer shutter is moved in the direction of the arrow A by a slight amount, the port 132 is uncovered and the relay 128 excited by cell 126 to close the circuit 127, 133', 15, $133^3$, 129, 130 to 127, thus passing current from the main 127 through furnace resistor 15 and cause a temperature rise in furnace 14. Should the shutter be moved in a direction opposite to the direction of the arrow, however, it would not uncover the light port, but merely move over to stop 85 without uncovering said port.

In operation, as shown in Fig. 4, the slide 115 and rheostat 123 have been set to send a predetermined E. M. F. through the thermocouple and potentiometer circuits. If the E. M. F. generated by the thermocouple becomes greater or less than the opposing potential difference of the potentiometer circuit, the coil 1 will be deflected from its zero point.

If the deflection of the coil 1 is in such direction as to uncover the port 132 above the cell 126, then the relay 128 is energized. This results in the armature 130 making contact with 129 and current passed through 15. Thus, the temperature is regulated to be increased. Should the temperature get too high, the thermocouple E. M. F. becomes greater than the potentiometer E. M. F. and the coil 1 is swung to port covering position.

*The modification shown in Figs. 5 to 7 inclusive*

In these figures there is shown an optical modification of the galvanometer temperature control mechanism, without recording, shown in Fig. 4. This optical arrangement may be used as an equivalent of the shutter mechanism shown in Fig. 4.

Light beams E from the light source 38 are concentrated by a lens 140 on a mirror 141 carried by the galvanometer 1. The beams are then reflected onto a fixed, curvilinear mirror surface 144, said mirror having the form of a right section of a hollow elliptical cylinder. In this case, the inner surface is the reflecting surface.

The beams are reflected from galvanometer mirror 141 to the photoelectric cell 126, housed in a box 125, Fig. 5, through reflection from mirror 141. To provide a cut-off point for the light beams E, a light cut-off stop or diaphragm 142 is interposed between the mirrors 141 and 144. The stop 142 may also be placed between the cell 126 and mirror 144. A portion of the mirror 144 may be left unsilvered and the beams thus absorbed on this surface on mirror 144.

The mirror 144, geometrically, is a section of a hollow, right, elliptical cylinder. The galvanometer coil 1 and cell 126 are so arranged that the axis of the coil 1 and the sensitive plate of the cell 126 are each located on a line F, in the plan views of Fig. 5, as shown in Figs. 6 and 7, said line passing through one of the foci of the ellipses forming the top and bottom boundaries of the elliptical mirror 144.

Since from the law of the ellipse, the tangent and normal to an ellipse bisect, respectively, the external and internal angles formed by the focal radii at the point of contact, it is evident that light beams reflected from the galvanometer carried mirror 141 will be projected onto the cell 126, no matter what angle the mirror 141 may assume. Thus, as shown in Figs. 6 and 7, this feature allows for a larger amplitude of deflection of the coil 1, the utilization of which is limited only by the opening in the interposed light stop 142.

*The modification shown in Figs. 8 and 9*

Fig. 8 shows an optical arrangement to be applied to a system as shown in Figs. 1, 2, and 3, including temperature control and recording, the arrangement here shown being used to replace the shutter mechanism in Figs. 1 and 2, and the mirror structure in Fig. 3.

The coil 1, of the galvanometer, carries a fixed mirror 141, as explained in Figs. 5–7 inclusive, which reflects a beam F onto a compound elliptical mirror 144—144'. The arrangement shown in Fig. 8 is similar to that in Fig. 5, but the cells and mirror are duplicated. Two cells 126, 126 encased in housings 125', 125' receive the angularly reflected beam F from the single light source 38, through condenser lens 140 to the galvanometer mirror 141 and thence to either elliptical mirror surfaces 144, 144'.

The light beams F from source 38 are concentrated by a lens 140 on the mirror 141. When the coil 1 is in rest or zero position the beam F strikes the mirror 141 and is reflected to the intersection 145 of the two surfaces 144, 144'. An unsilvered strip may be left at this point for the light beams to be absorbed, or a diaphragm may be interposed in front of said intersection, or the light beams may be passed through a slot at this point, not shown. It is understood, of course, that instead of a compound mirror, separate mirrors, shaped as shown, may be substituted.

The two mirror surfaces 144, 144' are so located that the foci all lie on the same straight line and two of the foci, one for each ellipse, are coincidental. The concave faces of both mirrors are toward mirror 141, as shown in the plan view, Fig. 9, and the pivotal axis of the galvanometer 1 passes through this coincidental foci point. The shielded cells 126, 126 are positioned on either side of the mirror 141, as shown.

The operation is obvious. The deflection of the coil 1 in either direction casts a beam E or E' upon the mirror surfaces 144 or 144' and, being reflected, thus activate either of cells 126, 126.

*The modification shown in Figs. 10 and 11*

This is an optical arrangement adapted to be applied in the same manner as that shown in Fig. 8 and carries with it similar features to the photoelectric cell control shown in Fig. 2, and may be utilized for both temperature control and recording. The galvanometer coil 1 carries a fixed mirror 141 on stem 150 affixed thereto. A shaft 151 mounted in said stem 150 and at right angles thereto cooperates to function as a limiting stop arm. The end of shaft 151 extends into and cooperates with the limiting lugs on stop 152, to restrict the deflection of the coil 1 to the desired limits.

The photoelectric cells 155, 154 are positioned in opposite compartments formed by partition 157 which divides the supporting base 153. A light intercepting baffle 156 is positioned at right angles upon and to the partition 157 and serves as a single shield for the two photoelectric cells 154 and 155 and normally serves to shield the cells from the beams G reflected from mirror 141 when the galvanometer mirror 141 is in zero position. The beams are concentrated on the mirror from a constant light source 38 by a condenser lens 140.

As shown in the plan view in Fig. 11, when the mirror 141 is in zero position and undeflected, the beams G are projected upon the baffle 156 and are absorbed. When the mirror is in deflected position the beams H are reflected to either side of the baffle 156, and the incident beams H are projected upon the cells 154 or 155 and cause actuation of the temperature controller-recording means such as is shown in Figs. 1 and 2.

*The modification shown in Figs. 12 to 15 inclusive*

Herein is shown a modification of the galvanometer controlled mechanism as disclosed in Fig. 4. In this form, a pair of axially opposed shutters 160, 161 are affixed to the galvanometer shaft 164 for movement therewith. The shaft 164 is attached to the galvanometer 1 which is pivotally supported upon suspension wires 91. The coil and shutter assembly is mounted between a pair of diaphragm stops 165, 166, both of which are provided with diaphragm apertures 168, 169 respectively.

The two aligned shutters 160, 161 are provided with cut-out sections 162 and 163 whereby to pass light through apertures 168, 169 when the galvanometer is out of zero position. When the galvanometer is moved into zero position, the baffle portions 162'—163' are brought into light axis H and prevent light from passing to the single photoelectric cell 167. This arrangement permits of providing twice the amount of light opening to the photoelectric cell for the same amount of galvanometer deflection as hereinbefore disclosed, and at greater speed.

Shutter limiting stops 170, 171 are mounted upon the baffle 166, adjacent the shutter 161, to limit the deflection of the galvanometer, as heretofore.

The detailed operation of this modification is shown in the plan views in Figs. 13, 14, and 15. When the coil is in rest or zero position, Fig. 13, light passes through diaphragm 168, but is prevented from passing further through diaphragm 169 to cell 167 by the blocking action of the portions 162'—163' of the shutters 160—161.

In the plan view, Fig. 14, the coil 1 and shutter 160—161 are shown to have been deflected out of zero position to render cell 167 inactive. In this position the baffle portions 162'—163' of the shutter prevent the light passing through aperture 166 to the cell 167.

In the plan view, Fig. 15, the shutters are shown in opposite or cell activating position, the galvanometer coil 1 having been moved to opposite position to that shown in Fig. 14, the baffles 160, 161 being deflected out of the path of beams H thereby uncovering the apertures 168—169 and passing light from 38 through to cell 167.

It should be understood that these various galvanometer controlled mechanisms may be used with either of the systems shown in Figs. 1, 2, or 4, as our invention is not limited to the specific details illustrated or to the specific arrangement thereof, since various modifications may be made therein within the spirit of the invention and the scope of the appended claims.

We claim:

1. A light responsive control mechanism comprising a casing, a partition dividing said casing into two compartments, a photoelectric cell in each compartment, a galvanometer coil adapted to be deflected, a reflecting surface operatively associated with said coil, a deflection limiting mechanism associated with said coil and surface, a source of light normally in non-activating position relative to said cells, a lens to concentrate light from said source upon said surface, a light obstructing member associated with said casing and adapted to obstruct the passage of light reflected from said surface when said coil is in non-deflected position only, said limiting mechanism being positioned and constructed to prevent said reflecting surface from passing light beyond the cells.

2. An automatic heat control mechanism including a furnace, a heating means therefor, and means associated with said heating means to control the temperature of said heating means comprising a motor and motor circuit, adjustable means operatively interposed between said motor and said heating control means to limit the temperature of said heating means, a source of variable current responsive to the action of said heating means, a galvanometer circuit actuated by said current, a potentiometer circuit connected to said galvanometer circuit and in equilibrium therewith, a source of light, a light-actuated motor circuit current passing means, and means influenced by the action of the galvanometer potentiometer circuit to vary said light source upon said current passing means.

3. An automatic heat control mechanism including a furnace, a heating means therefor, and means associated with said heating means to control the temperature of said heating means comprising a motor and motor circuit, settable means operatively interposed between said motor and said heating control means to limit the temperature of said heating means, a source of variable current responsive to the action of said heating means, a galvanometer circuit actuated by said current, a potentiometer circuit connected to said galvanometer circuit and in equilibrium therewith, a source of light, a light-actuated current passing means located to control said motor circuit, means influenced by the action of the galvanometer-potentiometer circuit to vary said light source upon said current passing means.

4. An automatic control mechanism including a furnace, a heating means therefor, and means associated with said heating means to record the temperature of said heating means comprising a motor and motor circuit, recording means operatively associated with said motor circuit and cooperating with said heating control means to record the temperature of said furnace, a source of variable current responsive to the action of said heating means, a galvanometer circuit actuated by said current, a potentiometer circuit connected to said galvanometer circuit and in equilibrium therewith, a source of light, a light-actuated motor circuit current passing stationary means, and means influenced by the action of the galvanometer potentiometer circuit to vary said light source upon said current passing means.

5. A control mechanism comprising a source of variable current responsive to a condition to be examined, a galvanometer circuit actuated by said current, a potentiometer circuit connected to said galvanometer circuit, movable indicator means for maintaining said potentiometer circuit in equilibrium with the galvanometer circuit, a source of light, a light-controlled current passing stationary means, and means influenced by the action of the galvanometer potentiometer circuit to vary said light source upon said current passing means, and means controlled by the current passing means to control said movable means.

6. A control mechanism comprising a source of variable current responsive to a condition to be examined, a galvanometer circuit actuated by said current, a potentiometer circuit connected to said galvanometer circuit, means including a movable part for maintaining said potentiometer circuit in equilibrium with the galvanometer circuit, a source of light, a light-controlled current passing stationary means, and means influenced by the action of the galvanometer potentiometer circuit to vary said light source upon said current passing means, and recording means actuated by said movable part.

7. An automatic heat recording mechanism for a furnace having a heating means, said recording means being associated with said heating means for recording the temperature in said furnace, said recording means comprising a motor and motor circuit, a source of variable current responsive to the action of the heat in said furnace, a galvanometer circuit actuated by said current, a potentiometer circuit connected to said galvanometer circuit and comprising a variable resistance controllable by the motor to keep the potentiometer circuit in equilibrium with the galvanometer circuit, a source of light, a light-actuated current passing means located to control said motor circuit, means influenced by the action of the galvanometer-potentiometer circuit to vary said light source upon said current passing means, and a recording device operated by said motor for recording the temperatures of said furnace.

8. An automatic heat recording mechanism for a furnace having a heating means, said recording mechanism comprising a motor and motor circuit, a source of variable current responsive to the action of the heat in said furnace, a galvanometer circuit actuated by said current, a potentiometer circuit connected to said galvanometer circuit and including variable means controlled by the motor for maintaining the potentiometer circuit in equilibrium with the galvanometer circuit, a source of light, a light-actuated motor circuit current passing means, and means influenced by the action of the galvanometer-potentiometer circuit to vary said light source upon said current passing means.

9. A control mechanism comprising a source of variable current responsive to a variable condition, a galvanometer circuit actuated by said current, a potentiometer circuit connected to said galvanometer circuit, movable means for maintaining said potentiometer circuit in equilibrium with the galvanometer circuit, a source of light, a light-controlled current passing means, and means influenced by the action of the galvanometer potentiometer circuit to vary said light source upon said current passing means, and a translating means controlled by the light passing means.

10. A control mechanism comprising a source of variable current responsive to a condition to be maintained, a galvanometer circuit actuated by said current, a potentiometer circuit connected to said galvanometer circuit, means including a movable part for maintaining said potentiometer circuit in equilibrium with the galvanometer circuit, a source of light, a light-controlled current passing means, and means influenced by the action of the galvanometer potentiometer circuit to vary said light source upon said current passing means, and means controlled by said movable part for controlling said condition.

11. An automatic heat recording and control mechanism including a furnace, a heating means therefor, and means associated with said heating means to control the temperature of said heating means comprising a motor and motor circuit, a shaft positively rotated by said motor in constant ratio therewith; settable cams carried on said shaft, switches operated by said cams to control said heating control means to limit the temperature of said heating means, a source of variable current responsive to the action of said heating means, a galvanometer circuit influenced by said current, a source of light, light-sensitive stationary current passing means located to control said motor circuit, and means immediately influenced by the action of the galvanometer to vary the effect of said light source on said light-sensitive means.

12. An automatic heat recording and control mechanism including a furnace, a heating means therefor, and means associated with said heating means to control the temperature of said heating means comprising a motor and motor circuit, adjustable settable means operatively interposed between said motor and said heating control means to limit the temperature of said heating means, a source of variable current responsive to the action of said heating means, a galvanometer circuit influenced by said current, a source of light, a light-actuated current passing means located to control said motor circuit, means influenced by the action of the galvanometer to vary said light source upon said current passing means.

13. In combination, a furnace, a heating means therefor, and a heat-controller mechanism controlled by the heat of said furnace comprising a motor and motor circuit, a source of variable current responsive to the action of said heating means, a galvanometer circuit actuated by said current, a potentiometer circuit connected to said galvanometer circuit and in equilibrium therewith, a pair of light-actuated current passing means located to control said motor circuit for rotating the motor in opposite directions respectively, means influenced by the action of the galvanometer-potentiometer circuit to control said current passing means respectively, and translating means operated by said motor.

14. A light responsive control mechanism comprising a pair of adjacent photoelectric cells, a single light baffling means separating said cells, a galvanometer coil adapted to be deflected, a light controlling means operatively associated with said coil, a source of light, cooperating with said controlling means to cause the light from said source to fall on one cell when said controlling means is in one position, and on the other when in another position, said controlling means being movable by the coil in a plane of movement perpendicular to the axis of movement of the coil and disposed at an angle to the rays from said source to said plane.

15. A light responsive control mechanism comprising a pair of adjacent photoelectric cells, a pair of compartments housing said cells respectively and comprising a single opaque partition separating said cells, a galvanometer coil adapted to be deflected, a light controlling means operatively associated with said coil, a source of light normally in non-activating position relative to said cells, and cooperating with said controlling means to cause the light from said source to fall on one cell when said controlling means is in one position, and on the other when in another position, said controlling means being movable by the coil in a plane of movement perpendicular to the axis of movement of the coil and disposed at an angle to the rays from said source to said plane.

16. In combination, a furnace, a thermocouple therein, adjustable heating means for the furnace, a galvanometer, a potentiometer circuit including said galvanometer and thermocouple and comprising a variable resistance, having a movable means, by which the potentiometer circuit may be placed in equilibrium, a motor having a constant ratio connection with said movable means for adjusting said movable means, light controlled current passing means immediately influenced by the action of the galvanometer for supplying positive or negative current to said motor to run the motor forward or backward, thereby to control immediately the motor whenever and as soon as, and as long as, said influence takes place, and additional visible movable means controlled by the action of said motor, and moved in opposite directions when the temperature of the furnace is raised or lowered to indicate movement of the adjustable means and adjustment which ought to be made by the heating means.

17. In combination, a furnace, a thermocouple therein, adjustable heating means for the furnace, a galvanometer, a potentiometer circuit including said galvanometer and thermocouple and comprising a variable resistance, having a movable part, by which the potentiometer circuit may be placed in equilibrium, a motor for adjusting said heating means, a stationary light-controlled current passing means immediately influenced by the action of the galvanometer to vary the action of the current passing means, for immediately supplying positive or negative current to said motor to run the motor forward or backward, thereby to control immediately the motor whenever and as soon as, and as long as, said influence takes place, and additional visible movable means controlled by the action of said motor, and moved in opposite directions when the temperature of the furnace is raised or lowered to indicate adjustment made by the heating means.

18. In combination, a furnace, a source of current responsive to the temperature in the furnace, a galvanometer circuit actuated by said current and comprising a galvanometer in the circuit, a potentiometer circuit connected to said galvanometer circuit and comprising a variable resistance, having a movable part by which the potentiometer circuit is placed in equilibrium with the galvanometer circuit, a motor having positive connection with said movable means for adjusting said movable means, stationary current passing means for supplying current to said motor, means influenced by the action of the galvanometer to vary the action of the light on the current passing means thereby to vary immediately the action of the motor whenever and as soon as said influence takes place, and temperature recording means for the furnace controlled by said motor.

19. In combination, a furnace, a thermocouple therein, adjustable heating means for the furnace, a galvanometer, a potentiometer circuit including said galvanometer and thermocouple and comprising a variable resistance, having a movable part, by which the potentiometer circuit may be placed in equilibrium, a motor having a constant ratio positive connection between said motor and said movable means for adjusting said movable means, and heating means, a stationary current passing means immediately influenced by the action of the galvanometer to vary the action of the current passing means for immediately supplying positive or negative current to said motor to run the motor forward or backward, thereby to control immediately the motor whenever and as soon as, and as long as, said influence takes place, and recording means controlled by the action of said motor, including a marking means moved in opposite directions whenever and as soon as the temperature of the furnace is raised or lowered to indicate adjustment made by the heating means, and to record adjustments of the heating means and to record temperature changes at all times when the heating means is not being adjusted.

20. In combination, a furnace, a source of current responsive to the temperature in the furnace, a galvanometer circuit actuated by said current and comprising a galvanometer in the circuit, a potentiometer circuit connected to said galvanometer circuit and comprising a variable resistance, having a movable part, by which the potentiometer circuit is placed in equilibrium with the galvanometer circuit, a motor for adjusting said movable means, a source of light, a stationary light-controlled current passing means for supplying current to said motor, means influenced by the action of the galvanometer to vary the action of the light on the current passing means, thereby to vary immediately the action of the motor whenever and as soon as said influence takes place, and adjustable heating means and temperature recording means for the furnace controlled by said motor, said recording means recording changes in the heating means as soon as they take place, and recording temperature changes substantially as soon as and whenever they take place.

21. In combination, a furnace, a thermocouple therein, adjustable heating means for the furnace, a galvanometer, a potentiometer circuit including said galvanometer and thermocouple and comprising a variable resistance, having a movable part, by which the potentiometer circuit may be placed in equilibrium, means for adjusting said movable means, means including a magnet controlling said heating means, a light-controlled current passing means, immediately influenced by the action of the galvanometer to vary the action of the light on the current passing means for immediately supplying current to said magnet thereby to control immediately the magnet whenever and as soon as, and as long as, said influence takes place.

22. A control mechanism comprising condition sensitive means, balancing means connected with said condition sensitive means for returning the condition sensitive means to a null point upon departure therefrom, and translating means controlled by said balancing means for indicating the balancing force necessary to maintain the condition sensitive means at the null point, and stationary light sensitive means controlled by said condition sensitive means for controlling the operation of said balancing means.

23. A control mechanism comprising means having a variable electrical characteristic responsive to a condition, electrical means responsive to said characteristic, a balancing circuit, said first named means and said electrical means being electrically connected into said balancing circuit, means including a movable part for balancing said balancing circuit when unbalanced by variation of said variable characteristic, a beam of light, light sensitive stationary means for controlling the operation of said movable part for balancing said circuit, and said electrical means controlling said light sensitive means by controlling the light affecting said light sensitive means.

24. A control mechanism comprising means having a variable electrical characteristic responsive to a variable condition, electrical means responsive to said characteristic, a potentiometer circuit connected with said first named means and said electrical means, movable means for balancing said potentiometer circuit, light-controlled means for operating said movable means, and means influenced by said electrical means for operating said light-controlled means.

25. In combination, means to be heated, means for controlling an agent influencing the temperature of the means to be heated, means having a variable electrical characteristic responsive to the temperature of the means to be heated, electrical means responsive to said electrical characteristic, a balancing circuit electrically connected to said variable characteristic means and said electrical means and having a variable resistance by which the circuit may be balanced, a motor for adjusting said variable resistance, stationary light sensitive means for controlling the supply of current to said motor, said electrical means controlling the operation of said light sensitive means to vary immediately the action of the motor whenever, and as long as, said balancing circuit is out of balance, and an additional movable visible means controlled by the action of said motor moved in one direction when the temperature is raised and in the opposite direction when lowered to indicate adjustment made to the variable resistance.

26. A light responsive control mechanism comprising a plurality of light sensitive means placed side by side, means to prevent light while affecting one of said light sensitive means from affecting the other light sensitive means, a condition sensitive element adapted to be deflected, a reflecting surface movable responsively to said condition sensitive element, a beam of light normally in non-actuating position relative to the light sensitive means, light obstructing means associated with said light sensitive means to prevent light reflected from said surface from affecting said light sensitive means when said condition sensitive element is in a certain position only, and limiting means for limiting the movement of said surface for preventing said surface from reflecting said beam in such a manner as to render the instrument inoperative.

27. A light responsive control mechanism comprising a plurality of photoelectric cells arranged side by side, means for preventing light affecting one cell from similarly affecting an adjacent cell, a condition sensitive element adapted to be deflected, light controlling means operatively associated with said condition sensitive element, a source of light cooperating with said controlling means to cause the light from said source to fall on different cells when said controlling means is in different positions, said controlling means being movable by the condition sensitive element in a plane of movement perpendicular to the axis of movement of the condition sensitive element and disposed at an angle to the rays from said source to said plane.

CHARLES H. WILSON.
CUTHBERT J. BROWN.